United States Patent [19]

Jacobs et al.

[11] 3,809,823

[45] May 7, 1974

[54] AUTOMATIC DISTRIBUTION OF SUBSCRIBER ASSISTANCE CALLS

[75] Inventors: Melvin A. Jacobs, Hinsdale; Jack W. Taugner, Des Plaines, both of Ill.

[73] Assignee: GTE Automatic Electric Laboratories Incorporated, Northlake, Ill.

[22] Filed: Apr. 2, 1973

[21] Appl. No.: 347,258

[52] U.S. Cl. .......................... 179/27 D, 179/27 FF

[51] Int. Cl. .......................... H04q 3/64

[58] Field of Search .......................... 179/27 D

[56] References Cited

UNITED STATES PATENTS 3,702,380 11/1972 Gueldenpfennig et al. ........ 179/27 D

*Primary Examiner*—William C. Cooper

*Attorney, Agent, or Firm*—Robert J. Black

[57] ABSTRACT

A technique for automatic distribution of calls to directory assistance operators' positions. Means are provided for effectively equalizing loads among operators and teams of operators and minimizing the effects of load fluctuation.

5 Claims, 1 Drawing Figure

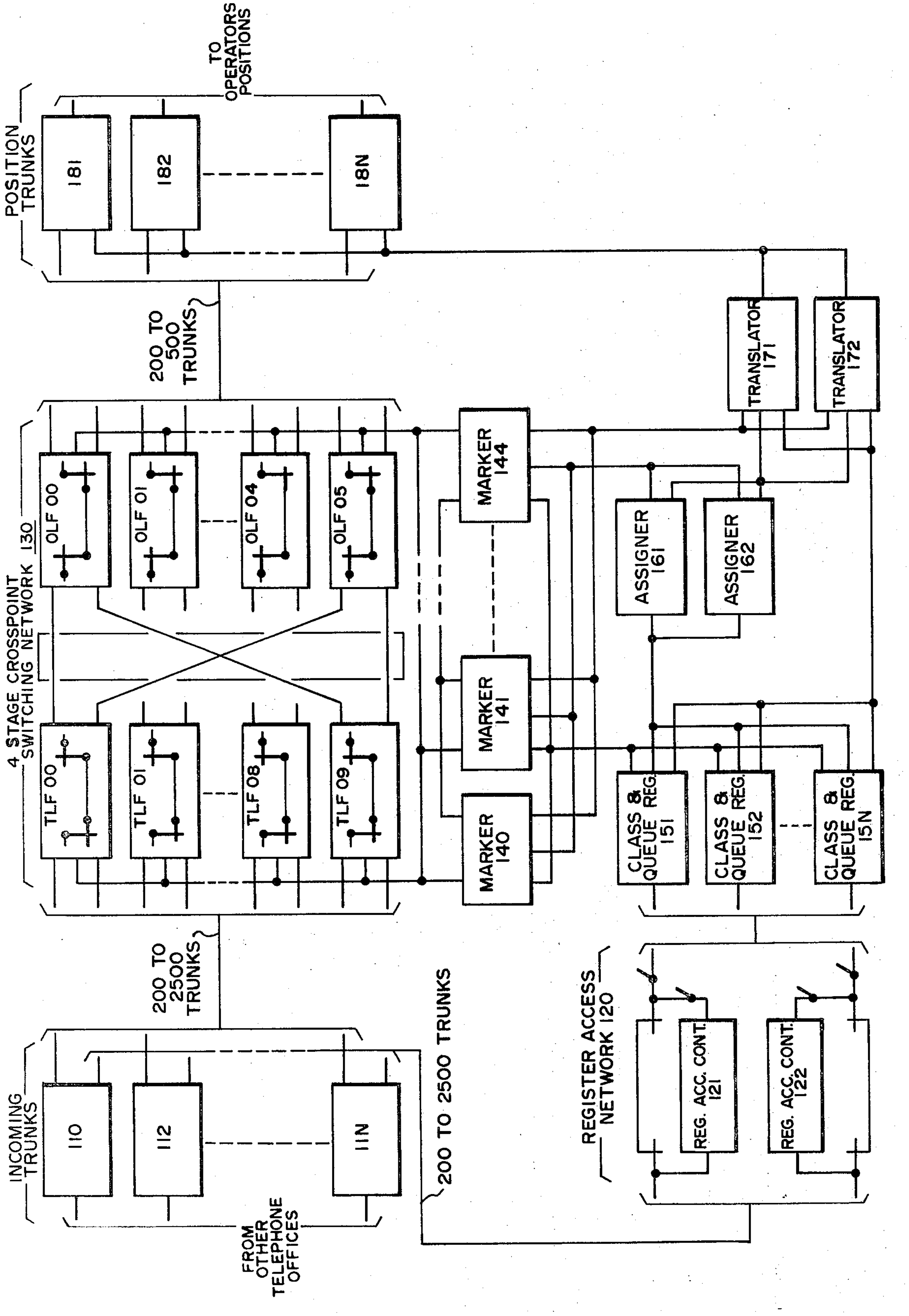
TO OPERATORS POSITIONS
POSITION TRUNKS
181
182
18N
200 TO 500 TRUNKS
TRANSLATOR 171
TRANSLATOR 172
4 STAGE CROSSPOINT SWITCHING NETWORK 130
OLF 00
OLF 01
OLF 04
OLF 05
TLF 00
TLF 01
TLF 08
TLF 09
MARKER 144
MARKER 141
MARKER 140
ASSIGNER 161
ASSIGNER 162
CLASS & QUEUE REG. 151
CLASS & QUEUE REG. 152
CLASS & QUEUE REG. 15N
200 TO 2500 TRUNKS
200 TO 2500 TRUNKS
REGISTER ACCESS NETWORK 120
REG. ACC. CONT. 121
REG. ACC. CONT. 122
INCOMING TRUNKS
110
112
11N
FROM OTHER TELEPHONE OFFICES

AUTOMATIC DISTRIBUTION OF SUBSCRIBER ASSISTANCE CALLS

BACKGROUND OF THE INVENTION

1. Field of the Invention

This invention relates to telephony, and more particularly to the automatic distribution of incoming traffic to directory assistance operators' positions. Ever increasing directory assistance (information) traffic loads require efficient methods of operation. Switching a large volume of information calls on a low delay basis presents unique problems.

To meet service, reliability and economic objectives over a wide range of traffic volumes of such calls the technique referred to as automatic call distribution has evolved. By means of automatic call distribution large volumes of calls directed to one or more addresses are connected to operators' positions in a rapid and efficient manner. Automatic call distribution systems generally are required for directory assistance use in telephone systems, however, they are also used for intercept and centralized rate and router quotation functions.

2. Description of the Prior Art

To furnish good service at the lowest possible cost it is necessary to maximize operator efficiency without introducing excessive delay in the handling of information calls. Efficient operation includes the equalization of loads among operators and terms of operators and minimization of the effects of offered load fluctuation. While understaffing of operating units minimizes cost, it invariably results in poor service. Therefore a compromise must be effected between position efficiency (occupancy) and the average delay in serving calls. For information service, the delay objective of many telephone operating companies is that not more than one call in a hundred be delayed for a period of more than 5 seconds.

While theoretically very large team sizes permit occupancies approaching 100 percent, an operator cannot perform at the peak level except for occasional short periods also, traffic operating experience indicates that loading a system beyond that permitting about 92 percent busy hour occupancy average, does not provide for the peaking of loads during portions of the busy hour. At the present time directory assistance facilities have incorporated either rotary switches or crossbar switches. Each of these types is limited to the number of positions it can effectively serve. The present invention is a new form of call distributor system based on the No. 1 Crosspoint Tandem Switching System manufactured by GTE Automatic Electric Incorporated. It is belived to provide the objectives of adequate service, reliability and economy over prior art systems.

SUMMARY OF THE INVENTION

In the present invention as noted previously the equipment incorporated into Automatic Electric Company's No. 1 Crosspoint Tandem System is incorporated in combination with Type 6L directory assistance desks also manufactured by GTE Automatic Electric Incorporated. Most of the subsystems employed are similar to those employed in the No. 1 Crosspoint Tandem Switching System while others may require minimum modification.

The value of a system which permits up to 500 positions in a single team may be understood by considering the daily fluctuation in a typical information bureau. Even during the business portion of the day, the load may at times be less than half of the busiest hour. For small teams this results in an average busy day occupancy considerably below the busy hour occupancy. However, the peaks and valleys of each of several small team loads are not likely to coincide from hour to hour and day to day. By combining traffic from several small teams into a common team the offered load remains at a level that permits a high position occupancy to be achieved over a major portion of the business day. Seasonal variations in load are also encountered and rebalancing of the load between small operating teams is periodically required. In the present invention there are two main categories of equipment units. These include: the switching network through which the talking paths are established, and the common control equipment which establishes the talking paths. Incoming trunk circuits are connected to the system at trunk link frames and position trunks are connected to office link frames. Connections are established from the incoming trunks to the position trunks through a reed relay crosspoint switch matrix. The information trunks which perform supervisory and signaling functions, connect directly or through carrier facilities, to the position trunks and control circuits associated with the operators' positions.

The switching network is located on trunk and office link frames of the system. The trunk and office link frames each have two switching stages. A maximum of 2,500 incoming trunks can be connected to any one of up to 500 positions in a full size system. The present system consists of a maximum of ten trunk link and five office link frames. Each trunk link frame to be equipped with one 100 trunk and one 50 trunk extension frame for a total of 250 incoming trunks per frame and up to 2,500 incoming trunks per system. The office link frames are arranged to terminate up to 100 position trunks and are used without extension frames.

The switching network is equipped for either two or four wire transmission.

In the present system a register sender access network and register sender access control provide information transfer facility between the incoming trunks and the switching control equipment. Included in the information transferred is the inlet identity and the pretranslation inlet class marks which are used to identify the class of position an incoming trunk should be connected to. In the present system a marker is employed to permit even distribution of traffic to the position trunks by changing the mode of selection of a trunk within a subgroup to a non-homeing sequence. The typical register sender subsystem found within automatic telephone switching systems is replaced by a new subsystem which will be referred to hereinafter as a class and queue register. Also included will be translators. These subsystems then will interface the markers and the register access controls to provide for passing the identity of the incoming trunks to the markers, translating pretranslation inlet class marks into position trunk class, providing the marker with a subgroup of idle position trunks with the proper class to select from, providing queueing to permit calls to be served in approximately the same order in which they are received, providing for distributing calls as evenly as possible over each class of idle positions and the signaling of positions via position trunks for the type of call they are receiving.

The trunk circuits used in connection with the present system are similar to conventional trunks except that incoming trunks require the addition of circuitry to permit operators to force release a trunk. The outgoing trunks are modified for interface with the type 6L operators' positions when the operators' positions are located in the same location as the switching equipment of the present invention.

BRIEF DESCRIPTION OF THE DRAWING

The single accompanying drawing is a diagram of the switching equipment employed in an automatic call distribution system in accordance with the present invention.

DESCRIPTION OF THE PREFERRED EMBODIMENT

Referring now to the accompanying drawing the following description will serve to describe the components of the present system for a better understanding. The incoming trunks 110, 112, etc. through 11N represent a quanity of anything from 200 to 2,500 trunks that provide access to the present system. The incoming trunks interface other offices of various types such as step by step, electronic, crosspoint tandem, etc. and either local or tandem offices, with the present automatic call distribution system. They also serve to adapt the various trunk signaling modes (E and M, loop, etc.) to the present system.

As may be noted by reference to the accompanying drawing each incoming trunk is cross connected to the inlets of a trunk link frame that forms a portion of the four stage crosspoint switching network 130 and to the register access network 120 including the call for service scanner portion of the associated register access control 121 or 122. The class and queue registers 151 through 15N inclusive are cross connected to the outlets of the register access network 120. The purpose of the register access network 120 is permit incoming trunks to be connected to idle class and queue registers and to provide a path for the markers to make continuity tests on each switching matrix path as established between an incoming and outgoing trunk. An additional function of the register access network 120 is to provide a path for the class and queue register to send a class digit to the selected operators' position via the incoming trunk, matrix and outgoing trunk.

The register access control 121 or 122 is employed to scan the incoming trunks in the present system and can accommodate up to 500 calls for service. It acts to connect trunks calling for service to idle class and queue registers 151, etc., via a register access network path. When a register access control circuit serves a call for service it will close a register access network path between the selected incoming trunk and an idle class and queue register. The register access control also determines the inlet identity (trunk link frame, switch and inlet numbers) and the class of the incoming trunk. This class represents the type of position trunk (information, rate and route, etc.) the call is to be switched to. Register access controls such as 121 or 122 store this information in the selected idle class and queue registers.

The class and queue registers 151, 152 through 15N inclusive provide queuing to permit calls to be served in approximately the same order they are received and to store the inlet identity and the called class. The class and queue registers also temporarily hold calls for which there are no idle position trunks available. An all trunk busy signal for equipped class of position trunks is returned to the class and queue registers. Each all trunk busy signal inhibits those registers containing calls for that group of position trunks from asking for a translator, unitl at least one idle position trunk is available. The class and queue registers also provide the means to impulse a class digit signal, to the operators' positions to light a class of call lamp at an associated operator's position. The class and queue registers when assigned a call will determine the place of the call in the queue and when its turn to be served arrives, the register will ask an assigner such as 161 or 162 for a translator such as 171 or 172.

The assigners 161 and 162 operate to recognize a class and queue register's call for translator and to assign the register to a translator, assigning an idle marker to the translator and to control the transmission of the called switching data from the translator to the marker.

The translators 171 and 172 function to translate the inlet class over the incoming trunk into the position trunk class, to distribute the calls uniformly among the available (idle) position trunks for each class of call, to transmit the inlet identity of the incoming trunk to the marker, to select two idle position trunks of the same class and the incoming trunk and transmit the outlet identities (called switching data) of the selected idle position trunks to the marker. The distribution of calls uniformly among the idle position trunks assures that each operator's position handles approximately the same number of calls.

When a translator is assigned to a class and queue register and it receives the inlet identity and the class of an incoming trunk, it will select two idle position trunks of the same class as the incoming trunk. The idle trunks selected will be the next trunks to be used in the class and will appear on two different office link frames (included in switching network 130). (Each position trunk (181 through 18N inclusive) is treated as a separate subgroup of trunks by the translator.) Having selected two idle one trunk subgroups the translator will request a marker. The assigner will assign an idle marker to the translator and the translator will transmit to the marker the inlet identity of the incoming trunk and the two idle position trunk identities. This data is referred to as call switching data. The translator will then transmit to the class and queue register the marker identity and release from the call.

The markers 140 through 144 inclusive function to select idle position trunks, set up a switching matrix path between the incoming trunks and the position trunks and to check selected paths for good continuity. When a marker has been selected by the assigner, assigned to its translator and has received the call switching data it will connect itself to the associated class and queue register and to the incoming matrix. The marker will then select one of the two idle position trunks and set up a path to the incoming trunk. When a marker has set up and checked out a path between an incoming trunk and a position trunk it will inform the associated class and queue registers to cut through to the position trunk.

The four stage crosspoint switching network 130 consists of a trunk link frame and office link frame incorporating the inlets and outlets to which the incoming trunks and position trunks are connected to respectively. Its operation is under control of the markers as mentioned previously.

A better understanding of the operation of the present system will be had by reference to the following description also taken into consideration with the accompanying sheet of drawings.

As noted each incoming trunk 110 through 11N is cross connected to the inlets of a trunk link frame that forms a part of the four stage crosspoint switching network 130 as well as to the register access network 120, associated with the trunk link frame and to the call for service scanner of the register access control 121 or 122 associated with register access network 120. Each register access control unit initiates its scan for incoming trunk "call for service" signals on a sequential basis by trunk link frame. When a register access control receives a call for service it will close a register access network path between the selected incoming trunk and an idle class and queue register. The register access control will also determine the inlet identity (trunk link frame, switch and inlet numbers) and the class of the incoming trunk. The register access control then stores the inlet identity in the selected idle class and queue register.

The class and queue registers 115 through 15N inclusive store the inlet identity of the call class and minimize individual call delays by insuring they are handled by the translators and markers in approximately the order they are received. They also temporarily hold calls for which there are no idle position trunks available. An all trunk busy signal per equipped class of position trunks is then returned to the class and queue registers. The class and queue registers also provide the means to outpulse a class digit, to light a corresponding class of call lamp on an associated operator's position. The class and queue registers when assigned a call, will determine the place of the call in the queue and when its turn to be served arrives the register will ask the assigner for a translator.

The assigner such as 161 or 162 will not recognize the class and queue register's request and assign the call to a translator such as 171 or 172. When the assigner assigns the register to a translator, the translator will receive the class of call mark (on a two-out-of-five coded basis) and the inlet identity of the incoming trunk associated with the call.

The translators 171 or 172 function to distribute calls as uniformly as possible among the available idle position trunks for each class of call. In doing this it assures that each operator's position handles approximately the same number of calls. When one of the translators 171 or 172 is assigned to a class and queue register (such as 151, etc.) and after it receives the inlet identity and class of an incoming trunk it will select two idle position trunks out of the group 181 through 18N inclusive of the same class as the incoming trunk. The idle trunks selected will be the next trunks to be used in the class and will normally appear on two different office link frames included in the switching network 130. Having selected two idle trunks the translator will now request a marker. The assigner will assign an idle marker to the translator and the translator will transmit to the marker the inlet identity of the incoming trunk and the two idle position trunk identities. The translator will then transmit to the class and queue register the marker identity and then release from the call.

The marker and class and queue register will now connect to each other for the purpose of the marker advising the register as to when to cut through to the position trunk. When a marker such as 140 to 144 inclusive, has received the call switching data and is connected to the class and queue register it will connect itself to the switching network 130 and set up a path between the incomining trunk and one of the two idle position trunks. When a marker has set up and checked out a path between an incoming trunk and a position trunk it will inform the associated class and queue register to cut through to the position trunk. The marker will then return to idle. When the class and queue register is connected to the position trunk it will outpulse the class digit to the position and then release from the call. Prior to releasing from the call the class and queue register will cut the incoming trunk through to the position trunk permitting conversation to ensue between the subscriber served by the incoming trunk and the operator at the assocated operators' position.

If any time during the progress of the call the calling party disconnects, the incoming trunk will become clear and the call will then be cleared from the switching system and the operators' position. If the calling party has not released the incoming trunk when the operator clears from her position, the cross matrix path will be dropped and the calling party will receive reorder tone from the incoming trunk.

Maintaining operators at every directory assistance location during light traffic periods (early evening or night time) is considered very inefficient and very uneconomical. To help improve on efficiency during periods of light traffic selected operator routes (classes) are closed down. In this event the present system transfers service requests normally handled by operators in the closed routes to other operators in working routes.

As noted previously the basic implementation of the present circuitry is similar to that employed in GTE Automatic Electric Incorporated's No. 1 Crosspoint Tandem Switching System. The various subsystems of the present invention are generally well known, and as such they may be implemented in a variety of forms limited only by the required functions described above. Accordingly the present invention lies not in the detailed circuitry of the present system but rather in the overall arrangement and operation of the system.

While but a single embodiment of the present system has been described, it will be obvious to those skilled in the art, that numerous modifications of the present system may be made without departing from the spirit and scope of the present invention, which shall be limited only by the claims appended hereto.

What is claimed is:

1. In a telephone system, means for the automatic routing of subscriber calls for assistance to operator service positions comprising: a plurality of incoming subscriber trunks; a plurality of outgoing operator's position trunks connected to at least one operator service position; a switching matrix connected between said incoming trunks and said outgoing trunks; a plurality of registers; a register access network connected between said incoming trunks and said registers, operated in response to a request for service from one of said incoming trunks to connect said trunk to an idle one of said registers; said connected register operated in response to connection to store the identity of said incoming trunk; a plurality of markers connectible to said switching matrix; a translator including circuit connections to said outgoing trunks; an assigner including circuit connections to said translator, to said markers and to said registers, operated in response to the detection of said operated register to connect said translator to said operated register, said translator operated in response to said connection to said register to select an idle portion of said plurality of outgoing trunks, and further operated to request of said assigner connection to an idle one of said markers; said assigner further operated in response to said request to connect an idle one of said markers to said translator, said translator further operated to transmit the identity of said incoming trunk and said selected outgoing trunks to said marker, and to transmit the identity of said selected marker to said register, said register further operated to complete a circuit connection to said selected marker; said marker operated in response to said translator to control said switiching matrix to establish a talking path through said switching matrix between said incoming trunk and one of said selected outgoing trunks; said register further operated to cut said incoming trunks through to said selected outgoing trunk over said established talking path through said switching matrix, whereby a subscriber served by said incoming trunk may converse with an operator at the service position connected to said selected outgoing trunk.

2. Automatic routing means as claimed in claim 1 wherein: each of said incoming trunks are characterized by a class of service identification; portions of said plurality of outgoing trunks are characterized by class of service identifications corresponding to those associated with said incoming trunks; said connector register operation further including the storage of the class identity of said incoming trunk.

3. Automatic routing means as claimed in claim 2 wherein: said translator in response to said class identity of said incoming trunk stored in said connected register operated to select an idle portion of said outgoing trunks characterized by a class identity corresponding to that of said incoming trunk.

4. Automatic routing means as claimed in claim 3 wherein: said translator further operation includes the transmission of said class identifications of said incoming trunk and said selected outgoing trunks, to said marker.

5. Automatic routing means as claimed in claim 3 wherein: said operator's portion connected to said outgoing trunk includes class indicating means; and said register in response to establishment of said talking path is further operated to transmit a class signal, representative of the class identity of said incoming trunk and said selected outgoing trunks, to said class indicating means; said indicating means operated to provide an indication of said class to an operator at said position.

* * * * *